US012492633B2

(12) United States Patent
Jones et al.

(10) Patent No.: US 12,492,633 B2
(45) Date of Patent: Dec. 9, 2025

(54) BRIDGE SENSOR DESIGN FOR WATER AND OIL ANALYSIS IN FORMATION TESTING

(71) Applicant: Halliburton Energy Services, Inc., Houston, TX (US)

(72) Inventors: Christopher Michael Jones, Houston, TX (US); Colin Douglas Tisdale, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 308 days.

(21) Appl. No.: 18/239,894

(22) Filed: Aug. 30, 2023

(65) Prior Publication Data

US 2024/0287902 A1 Aug. 29, 2024

Related U.S. Application Data

(60) Provisional application No. 63/448,228, filed on Feb. 24, 2023.

(51) Int. Cl.
*E21B 49/08* (2006.01)
*G01N 21/75* (2006.01)
*G01N 21/84* (2006.01)
*G01N 21/77* (2006.01)

(52) U.S. Cl.
CPC ........ *E21B 49/088* (2013.01); *E21B 49/0875* (2020.05); *G01N 21/75* (2013.01); *G01N 21/84* (2013.01); *G01N 2021/757* (2013.01); *G01N 2021/7793* (2013.01); *G01N 2021/8405* (2013.01)

(58) Field of Classification Search
CPC .... E21B 49/08; E21B 49/0875; E21B 49/088; G01N 21/75; G01N 21/84
See application file for complete search history.

(56) References Cited

U.S. PATENT DOCUMENTS

| | | | | |
|---|---|---|---|---|
| 4,011,754 A | * | 3/1977 | Pitt | G01F 1/325 |
| | | | | 250/227.14 |
| 4,501,157 A | * | 2/1985 | Perkinson | G01F 1/661 |
| | | | | 73/861.24 |

(Continued)

FOREIGN PATENT DOCUMENTS

WO WO-2005047647 A1 * 5/2005 ............... G01J 3/26

OTHER PUBLICATIONS

International Search Report and Written Opinion for International Patent Application No. PCT/US2023/032423 dated Dec. 26, 2023. PDF file. 8 pages.

*Primary Examiner* — John Fitzgerald
(74) *Attorney, Agent, or Firm* — John Wustenberg; C. Tumey Law Group PLLC

(57) ABSTRACT

A downhole fluid sampling tool may include an optical measurement tool and a viewing region disposed in the optical measurement tool. In examples, a bridge may be disposed in a transparent portion of the flow path between a light source and a light modifier and an optical detector. The bridge includes a structure comprising a substrate and a contrast agent, wherein the contrast agent is any molecule configured to interact with an analyte and alter a property of the analyte and/or contrast agent, wherein the property is detectable by the optical measurement tool.

20 Claims, 6 Drawing Sheets

(56) References Cited

U.S. PATENT DOCUMENTS

| | | | | |
|---|---|---|---|---|
| 4,730,885 | A * | 3/1988 | Doi | B23K 26/703 |
| | | | | 385/75 |
| 6,176,323 | B1 * | 1/2001 | Weirich | E21B 44/005 |
| | | | | 175/40 |
| 7,336,356 | B2 * | 2/2008 | Vannuffelen | G01N 21/31 |
| | | | | 250/269.1 |
| 7,362,422 | B2 | 4/2008 | DiFoggio et al. | |
| 7,835,003 | B2 * | 11/2010 | Jiang | G01N 21/80 |
| | | | | 436/528 |
| 8,077,314 | B2 * | 12/2011 | Davies | G01K 11/32 |
| | | | | 356/73.1 |
| 9,000,358 | B2 * | 4/2015 | Jamison | E21B 21/065 |
| | | | | 250/253 |
| 9,651,710 | B2 * | 5/2017 | Donzier | E21B 49/10 |
| 9,845,663 | B2 * | 12/2017 | Pelletier | E21B 49/10 |
| 10,241,030 | B2 * | 3/2019 | Indo | E21B 49/08 |
| 10,775,359 | B2 | 9/2020 | Jones et al. | |
| 10,781,689 | B2 | 9/2020 | Perkins et al. | |
| 11,352,884 | B2 | 6/2022 | Golovko et al. | |
| 11,371,345 | B2 | 6/2022 | Olapade et al. | |
| 11,630,233 | B2 | 4/2023 | Olapade et al. | |
| 11,649,724 | B2 | 5/2023 | Elhawary et al. | |
| 11,719,096 | B2 | 8/2023 | Olapade et al. | |
| 11,879,330 | B2 * | 1/2024 | LeBlanc | G01N 21/80 |
| 12,006,821 | B2 * | 6/2024 | Pelletier | E21B 49/08 |
| 12,134,968 | B2 * | 11/2024 | Jones | E21B 49/10 |
| 12,345,156 | B2 * | 7/2025 | Jones | E21B 49/0875 |
| 2004/0231408 | A1 | 11/2004 | Shammai | |
| 2009/0205441 | A1 * | 8/2009 | Ohtake | G01F 1/7084 |
| | | | | 73/861.95 |
| 2014/0293282 | A1 | 10/2014 | Indo et al. | |
| 2015/0354345 | A1 * | 12/2015 | Meier | E21B 49/088 |
| | | | | 73/1.16 |
| 2020/0284140 | A1 | 9/2020 | Jones et al. | |
| 2020/0378250 | A1 | 12/2020 | Olapade et al. | |
| 2020/0392843 | A1 | 12/2020 | Golovko et al. | |
| 2020/0400858 | A1 | 12/2020 | Olapade et al. | |
| 2021/0396133 | A1 * | 12/2021 | Jones | E21B 49/0875 |
| 2021/0404332 | A1 | 12/2021 | Elhawary et al. | |
| 2022/0235657 | A1 | 7/2022 | Golovko et al. | |
| 2022/0275724 | A1 | 9/2022 | Olapade et al. | |
| 2023/0106930 | A1 | 4/2023 | Olapade et al. | |
| 2023/0221459 | A1 | 7/2023 | Olapade et al. | |
| 2023/0235666 | A1 | 7/2023 | Elhawary et al. | |
| 2024/0393542 | A1 * | 11/2024 | Goya | G02B 6/264 |
| 2025/0215796 | A1 * | 7/2025 | Jones | G01N 27/125 |

* cited by examiner

BRIDGE SENSOR DESIGN FOR WATER AND OIL ANALYSIS IN FORMATION TESTING

CROSS REFERENCE TO RELATED APPLICATIONS

This application claims the priority of U.S. Provisional Patent Application No. 63/448,228, filed Feb. 24, 2023, which is incorporated by reference in its entirety.

BACKGROUND

Wells may be drilled at various depths to access and produce oil, gas, minerals, and other naturally occurring deposits from subterranean geological formations. The drilling of a well is typically accomplished with a drill bit that is rotated within the well to advance the well by removing topsoil, sand, clay, limestone, calcites, dolomites, or other materials.

During or after drilling operations, sampling operations may be performed to collect a representative sample of formation or reservoir fluids (e.g., hydrocarbons) to further evaluate drilling operations and production potential, or to detect the presence of certain gases or other materials in the formation that may affect well performance.

During sampling operations, an optical measurement may be performed on a fluid sample collected during sampling operations. Such optical measurements may be highly affected by multiphase measurements (oil, water, gas), particles, and light fluctuations. The problem is only exasperated for water sampling. These issues may extend optical measurement time and create unreliable optical measurement results.

BRIEF DESCRIPTION OF THE DRAWINGS

The features and advantages of certain examples will be more readily appreciated when considered in conjunction with the accompanying figures. The figures are not to be construed as limiting any of the preferred examples.

DETAILED DESCRIPTION

Figure 1:
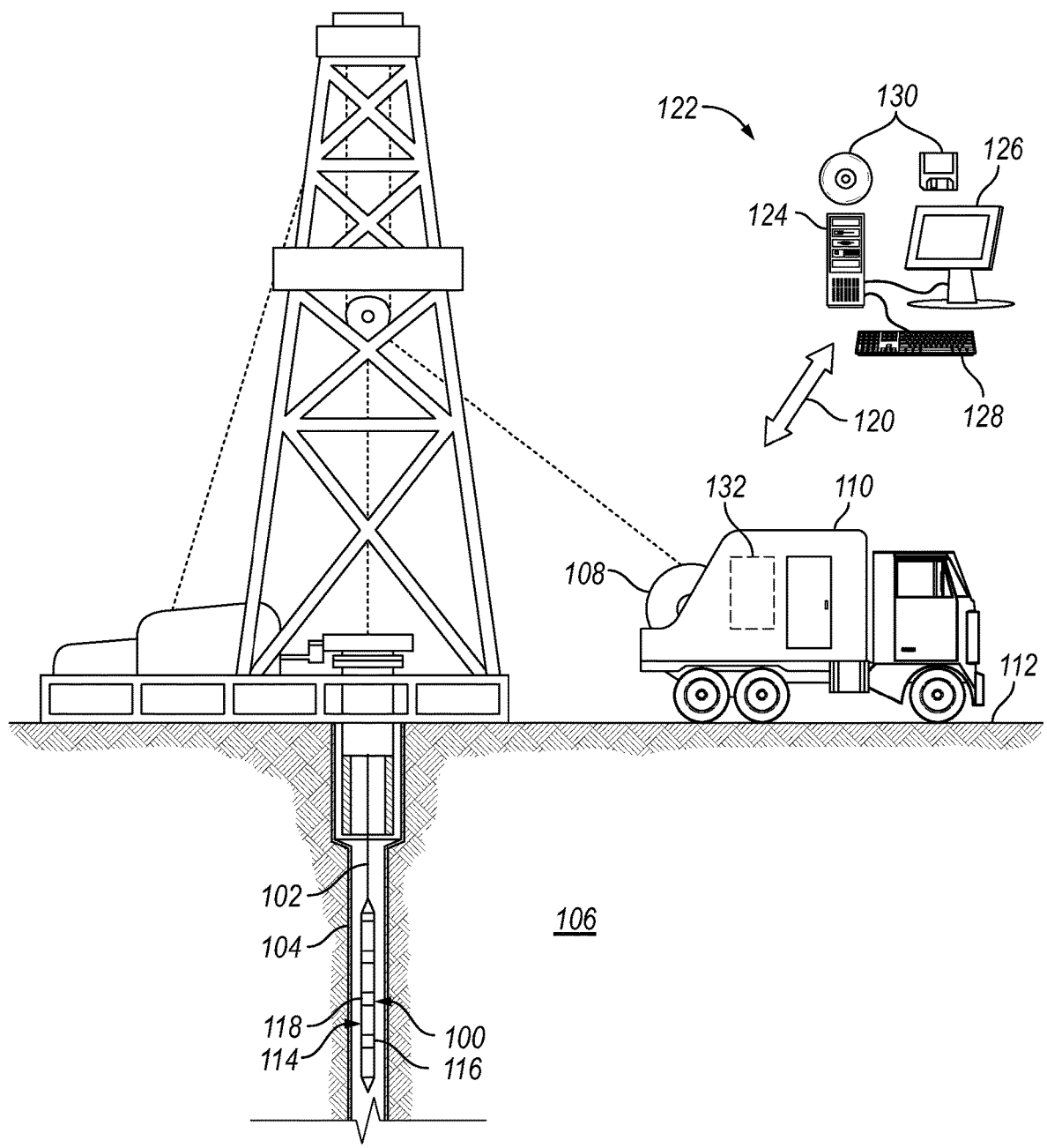
FIG. 1 illustrates a schematic view of a well in which an example embodiment of a fluid sample system is deployed.

The present disclosure relates to methods and systems that utilize a bridge design in an optical sensor to mitigate the presence of multiphase flows (water, oil, or gas) and particulates interference in optical measurements with respect to water and oil with optical analysis. Optical analysis is conducted by directing electromagnetic radiation herein called light through a sample section and then to an electromagnetic detector. The light does not have to be visible to be considered light. The optical analysis may contain a light modification section such as a wavelength discrimination device or a filter, or a modulator. The light modification section may be combined with the light source such as but not limited to the example of a laser, or the detector such as but not limited to a wavelength selective detector or may be a separate device such as but not limited to the example of a spectrometer. As a separate device, the light modification section may be located along the path between the light source or the detector and on either side of the flow path. The sample flow section at the point of interaction with the optical analysis contains a flow path transparent to at least part of the electromagnetic radiation that is emitted from the source such that the light may interact with the sample or interact with a contrast agent indicative of the sample properties. The embodiment is described for an optical sensor but is applicable to any configuration of analysis for which energy of a different form than electromagnetic radiation is passed from a source through a sample to a detector. Two nonlimiting examples are acoustic energy passing from an acoustic source through a sample and to a detector. The light modification section may be replaced by an energy modification section and may combined with either the source, the detector or standalone as described for an optical section. The windows must be transparent to the energy type being transmitted through the sample and the substrate must contain a contrast agent which may be probed by the energy and be able to interact with the property of the sample to be measured.

The bridge design bridges between two pressure windows preferably recessed and includes a substrate that is wet to a single phase (i.e., oil or water). The substrate may be supported mechanically by an exoskeleton or an endoskeleton. The substrate may be any hydrogel, polyvinyl chloride, polymer, glass, ceramic, zeolite, for example. The substrate may comprise glass when hydrophilic substrate is needed for example. The substrate may be coated with polytetrafluoroethylene as hydrophobic substrate for example in order to promote measurements of an oil phase, or polyacrylic acid, polyurethanes, polyethylene oxide to promote measurements in an aqueous phase, for example. The substrate allows fluid flow in and out of the substrate for rapid chemical equilibrium. The substrate includes a contrast agent to enhance the detection of components in the absorbing phase of the bridged substrate. The contrast agent may be any molecules configured to interact with a targeted analyte and alter a property of the analyte and/or contrast agent, wherein the property is detectable by a downhole sensor. Examples of contrast agents include dyes, phenolphthalein, bromothymol blue, hematoxylin, methyl red, methylene blue, methyl orange, bromophenol blue, phenol red, bromocresol green, bromocresol purple, eriochrome blue-lack, eriochrome black T., eriochrome cyanine, methyl orange, calmagite, thymol blue, thymolphthalein, chromotropic acid disodium salt dihydrate, ferroin solution, murexide, xylenol orange, calcon, crystal violet, 1-naphtholbenzein, dithizone, neutral red, thorin, methylthymol blue sodium salt, indigo carmine, calconcarboxylic acid, titan yellow, cresol red, m-cresol purple, phthalein purple, congo red, disulfine blue, 1-(2-pyridylazo)-2-naphthol, fluorescein sodium, zinc iodide starch solution, phenol red solution, alizarin red S mono sodium salt, iodine indicator, bromocresol green sodium salt, ferroin indicator solution, calcein indicator, phenylhydrazinium chloride, arsenazo III, diphenylamine-4-sulfonic acid barium salt, 3,5-pyrocatecholdisulfonic acid disodium salt monohydrate, alkali blue, quinaldine red, sudan III, uranine AP, 1-naphtholphthalein, methyl red sodium salt, bromophenol red, fluorescent indicator, phenol red sodium salt, metanil yellow, phenolphthalein solution, naphthol green, 3-nitrophenol, pH-indicator solution, and pyrogallol red.

The substrate comprising the contrast agent may be supported mechanically against pressure fluctuations. The mechanical support of the substrate may be made of any ceramic, metal, polymer, or any combination thereof depending upon the pressure, temperature, and chemical environment. The bridge is designed to allow fluid flow around the bridge while channeling optical energy between the two windows. The bridge may contain hard scaffolding elements to provide rigid support for the bridge and hold the bridge in place.

FIG. 1 is a schematic diagram of fluid sampling tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible.

As illustrated, a hoist 108 may be used to run fluid sampling tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Fluid sampling tool 100 may be suspended in wellbore 104 on conveyance 102. Other conveyance types may be used for conveying fluid sampling tool 100 into wellbore 104, including coiled tubing and wired drill pipe, for example. Fluid sampling tool 100 may comprise a tool body 114, which may be elongated as shown on FIG. 1. Tool body 114 may be any suitable material, including without limitation titanium, stainless steel, alloys, plastic, combinations thereof, and the like. Fluid sampling tool 100 may further include one or more sensors 116 for measuring properties of the fluid sample, reservoir fluid, wellbore 104, subterranean formation 106, or the like. In examples, fluid sampling tool 100 may also include a fluid analysis module 118, which may be operable to process information regarding a fluid sample, as described below. The fluid sampling tool 100 may be used to collect fluid samples from subterranean formation 106 and may obtain and separately store different fluid samples from subterranean formation 106.

In examples, fluid analysis module 118 may comprise at least one sensor that may continuously monitor a fluid such as a reservoir fluid, formation fluid, wellbore fluid, or nonnative formation fluid (e.g., drilling fluid filtrate). Such monitoring may take place in a fluid flow line or a formation tester probe, such as in a pad or packer. Alternatively, continuous monitoring of fluid may include making measurements to investigating the formation, for example, by making measuring a local formation property with a sensor. Sensors may include, without limitation, optical sensors, acoustic sensors, electromagnetic sensors, conductivity sensors, resistivity sensors, selective electrodes, impedance sensors, density sensors, mass sensors, analyte sensors, thermal sensors, chromatography sensors, viscosity sensors, fluid rheology sensors, bubble point sensors, fluid compressibility sensors, flow rate sensors, pressure sensors, nuclear magnetic resonance (NMR) sensors. Sensors may measure a contrast between drilling fluid filtrate properties and formation fluid properties. Fluid analysis module 118 may be operable to derive properties and characterize the fluid sample. By way of example, fluid analysis module 118 may measure absorption, transmittance, or reflectance spectra, and translate these measurements into, for example, component concentrations of the fluid sample, which may be lumped component concentrations, as described above. The fluid analysis module 118 may also measure gas-to-oil ratio, fluid composition, water cut, live fluid density, live fluid viscosity, formation pressure, formation temperature and/or fluid composition. Fluid analysis module 118 may also be operable to determine fluid contamination of the fluid sample and may include any instrumentality or aggregate of instrumentalities operable to compute, classify, process, transmit, receive, retrieve, originate, switch, store, display, manifest, detect, record, reproduce, handle, invert, or utilize any form of information, intelligence, or data for business, scientific, control, or other purposes. The absorption, transmittance, or reflectance spectra absorption, transmittance, or reflectance spectra may be measured with sensors 116 by way of standard operations. For example, fluid analysis module 118 may include random access memory (RAM), one or more processing units, such as a central processing unit (CPU), or hardware or software control logic, ROM, and/or other types of nonvolatile memory. Fluid analysis module 118 and fluid sampling tool 100 may be communicatively coupled via communication link 120 with information handling system 122.

Any suitable technique may be used for transmitting signals from the fluid sampling tool 100 to the surface 112. As illustrated, a communication link 120 (which may be wired or wireless, for example) may be provided that may transmit data from fluid sampling tool 100 to an information handling system 122 at surface 112. Information handling system 122 may include a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from fluid sampling tool 100. For example, information handling system 122 may process the information from fluid sampling tool 100 for determination of fluid contamination. The information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole hole or at surface 112 or another location after recovery of fluid sampling tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

Figure 2:
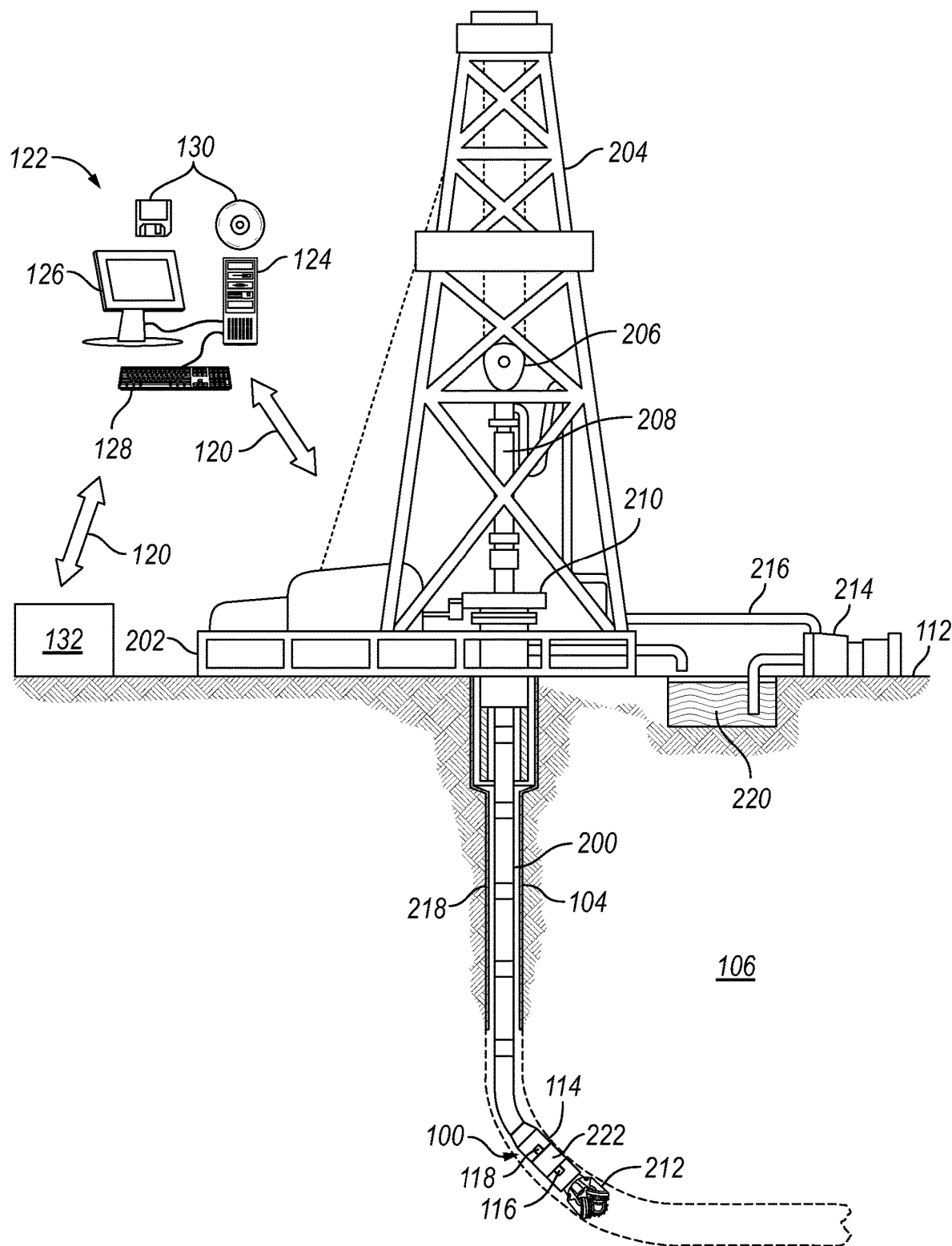
FIG. 2 illustrates a schematic view of another well in which an example embodiment of a fluid sample system is deployed.

Referring now to FIG. 2, a schematic diagram of fluid sampling tool 100 disposed on a drill string 200 in a drilling operation. Fluid sampling tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106.

As illustrated, a drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, PDC bits, natural diamond bits, any hole openers, reamers, coring bits, and the like. As drill bit 212 rotates, it may create and extend wellbore 104 that penetrates various subterranean formations 106. Pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and fluid sampling tool 100. Fluid sampling tool 100, which may be built into drill collars 222 may gather measurements and fluid samples as described herein. One or more of the drill collars 222 may form a tool body 114, which may be elongated as shown on FIG. 2. Fluid sampling tool 100 may be similar in configuration and operation to fluid sampling tool 100 shown on FIG. 1 except that FIG. 2 shows fluid sampling tool 100 disposed on drill string 200. Alternatively, the sampling tool may be lowered into the wellbore after drilling operations on a wireline.

Fluid sampling tool 100 may further include one or more sensors 116 for measuring properties of the fluid sample reservoir fluid, wellbore 104, subterranean formation 106, or the like. The one or more sensors 116 may be disposed within fluid analysis module 118. In examples, more than one fluid analysis module may be disposed on drill string 200. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. The fluid sampling tool 100 may be used to collect a fluid sample from subterranean formation 106 when the filtrate content has been determined to be sufficiently low. Sufficiently low depends on the purpose of sampling. For some laboratory testing, below 10% drilling fluid contamination is sufficiently low, and for other testing, below 1% drilling fluid filtrate contamination is sufficiently low. Sufficiently low also depends on the nature of the formation fluid such that lower requirements are generally needed, for example, for formation fluids having lighter oils as designated by a higher gas-to-oil (GOR) ratio or a higher American Petroleum Institute (API) gravity. Sufficiently low also depends on the rate of cleanup in a cost benefit analysis since longer pumpout times required to incrementally reduce the contamination levels may have prohibitively large costs. As previously described, the fluid sample may comprise a reservoir fluid, which may be contaminated with a drilling fluid, drilling fluid filtrate, another contaminant, or a combination thereof. Fluid sampling tool 100 may obtain and separately store different fluid samples from subterranean formation 106 with fluid analysis module 118. Fluid analysis module 118 may operate and function in the same manner as described above. However, storing of the fluid samples in the fluid sampling tool 100 may be based on the determination of the fluid contamination. For example, if the fluid contamination exceeds a tolerance, then the fluid sample may not be stored. If the fluid contamination is within a tolerance, then the fluid sample may be stored in the fluid sampling tool 100. In examples, contamination may be defined within fluid analysis module 118.

Figure 3:
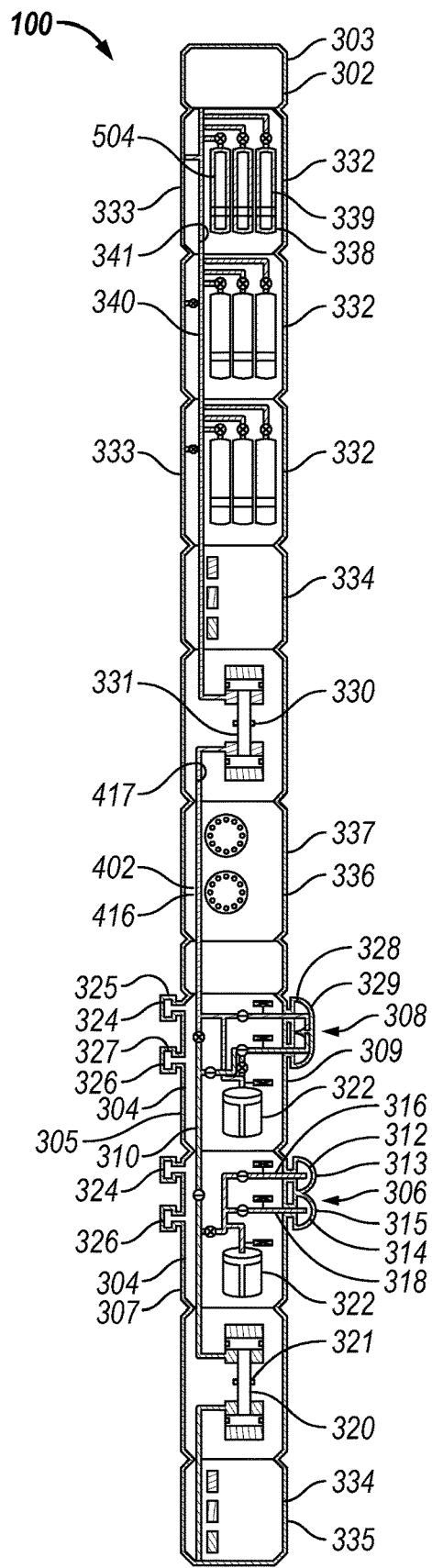
FIG. 3 illustrates a schematic of a fluid sampling tool.

FIG. 3 illustrates a schematic of fluid sampling tool 100. As illustrated, fluid sampling tool 100 includes a power telemetry section 302 through which fluid sampling tool 100 may communicate with other actuators and sensors in a conveyance (e.g., conveyance 102 on FIG. 1 or drill string 200 on FIG. 2), and/or the conveyance's communications system, such as information handling system 122 (e.g., referring to FIG. 1). In examples, power telemetry section 302 may also be a port through which the various actuators (e.g., valves) and sensors (e.g., temperature and pressure sensors) in fluid sampling tool 100 may be controlled and monitored. In examples, power telemetry section 302 may comprise an additional information handling system 122 (not illustrated) that exercises the control and monitoring function. In one example, the control and monitoring function is performed by an information handling system 122 in another part of the drill string or fluid sampling tool 100 (not shown) or by an information handling system at surface 112.

Information from fluid sampling tool 100 may be gathered and/or processed by the information handling system 122 (e.g., referring to FIGS. 1 and 2). The processing may be performed real-time during data acquisition or after recovery of fluid sampling tool 100. Processing may alternatively occur downhole or may occur both downhole and at surface 112. In some examples, signals recorded by fluid sampling tool 100 may be conducted to information handling system by way of conveyance. Information handling system may process the signals, and the information contained therein may be displayed for an operator to observe and stored for future processing and reference. Information handling system may also contain an apparatus for supplying control signals and power to fluid sampling tool 100.

In examples, fluid sampling tool 100 may include one or more enhanced probe sections 304 and stabilizers 324. Each enhanced probe section may include a dual probe section 306 or a focus sampling probe section 308. Both of which may extract fluid from the reservoir and deliver said fluid to a flow line 310 that extends from one end of fluid sampling tool 100 to the other. Without limitation, dual probe section 306 includes two probes 312, 314 which may extend from fluid sampling tool 100 and press against the inner wall of wellbore 104 (e.g., referring to FIG. 1). Probe flow lines 316 and 318 may connect probe 312, 314 to flow line 310 and allow for continuous fluid flow from the formation 106 to flow line 310. A high-volume bidirectional pump 320 may be used to pump fluids from the formation, through probe flow lines 316, 318 and to flow line 310. Alternatively, a low volume pump bidirectional piston 322 may be used to remove reservoir fluid from the reservoir and house them for asphaltene measurements, discussed below. Two standoffs or stabilizers 324, 326 hold fluid sampling tool 100 in place as probes 312, 314 press against the wall of wellbore 104. In examples, probes 312, 314 and stabilizers 324, 326 may be retracted when fluid sampling tool 100 may be in motion and probes 312, 314 and stabilizers 324, 326 may be extended to sample the formation fluids at any suitable location in wellbore 104. As illustrated, probes 312, 314 may be replaced, or used in conjunction with, focus sampling probe section 308. Focus sampling probe section 308 may operate and function as discussed above for probes 312, 314 but with a single probe 328. Other probe examples may include, but are not limited to, oval probes, packers, or circumferential probes.

In examples, flow line 310 may connect other parts and sections of fluid sampling tool 100 to each other. For example, Additionally, formation testing tool 100 may include a second high-volume bidirectional pump 330 for pumping fluid through flow line 310 to one or more multi-chamber sections 332, one or more fluid density modules 334, and/or one or more dynamic subsurface optical measurement tools 336.

Figure 4:
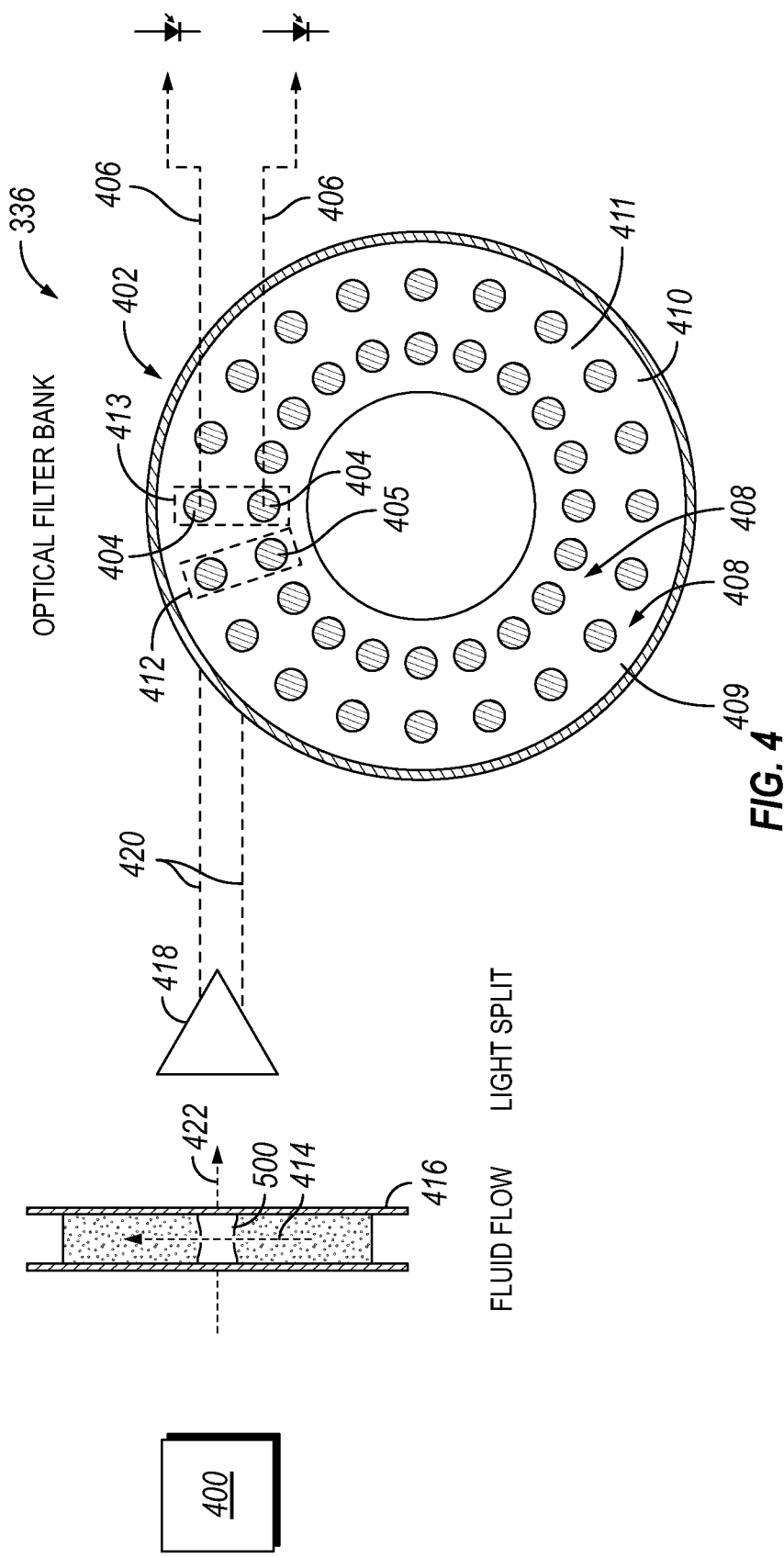
FIG. 4 illustrates a hardware configuration of a dynamic subsurface optical measurement tool.

FIG. 4 depicts a hardware configuration of a dynamic subsurface optical measurement tool 336. It should be noted that the channel disclosed herein may be a measurement of the light transmittance through an optical filter along a light path. Optical measurement tool 336 may include a light source 400, a filter bank light modifier 402 comprising a plurality of optical filters 404 (measurement of the light transmittance through an optical filter 406 is called a channel 406) configured as two rings 408 on optical plate 410, within a channel pair 412 on each azimuth. Other measurement devices requiring a path of energy transmission may be suitable for this invention as well, such as but not limited to acoustic transmission or conductance of electricity. Also the energy measurement technique may include setups other than filters. It should be noted that each channel 406 may be designed, based on the construction of each channel-respective optical filter 406, to measure different properties of fluid 414. During the rotation of optical plate 410, the two optical filters 404 on a channel pair 412 may be synchronized spatially or in time to measure substantially the same fluid 414 in viewing region 416. Viewing region 416 may be disposed within and/or is a part of channel 310 (e.g., referring to FIG. 1). As discussed below, and illustrated in FIG. 4, an active channel pair 413 is a channel pair 412 in which optical measurements may be taken to form one or more channels 406. In some examples, channel pairs 412 may be near synchronized such that channel pairs 412 have a sufficient probability of observing the same phase, i.e., better than 10%, but more desirably, more than 50%, and yet more desirably, more than 80%. In other examples, more than two channels 406 may be sufficiently synchronized according to a desired probability of observing a single phase in time or space. A velocity calculation of the fluid phase specific velocities may be used to aid synchronization over longer distances, or time. Alternatively, distribution calculations, or autocorrelation calculations may be used to improve synchronization over longer distances or time. If the channels are sufficiently close in distance or time, the channel signals may not need additional efforts of synchronization. During measurement, fluid samples 414 (which is formation fluid from passageway 306) may flow through a viewing region (optical or not) as a non-limiting example constructed by a set of windows or other transparent/semi-transparent region of the flow path or sample path. Alternatively, the viewing region or viewing area might not be transparent to visible light but rather to the form of energy used to measure the fluid characteristics for a given sensor such as but not limited to acoustic or electrical conductivity. As such a viewing region or area for an acoustic sensor would ideally have a low acoustic impedance even if it is not transparent to visible light. Alternatively, the viewing region or area may be transparent (i.e., pass energy with low attenuation) to infrared light, or magnetic fields instead of visible light. In some examples for some sensors, the viewing region 408 or area is more generally a measurement region 408 or area as is the case with some phase behavior sensors or some density sensors. In examples, viewing region 408 may be at least a part of passageway 306 and/or a branch off of passageway 306). In one nonlimiting example, light 418 absorbed by fluid sample 414 may be split into at least two ray paths 420. Split light rays 420 may be measured by detectors, not shown, as they pass through channel pair 412 separately. Filter bank 402 may rotate to another channel pair 412 after the measurement of each channel 406 from channel pair 412 and may dynamically gather an optical spectra measurement of all channels after a full sampling channel rotation. It should be noted, the methods disclosed herein may not be limited in simultaneous measurements of a channel pair 412 (two optical filters 414 and their respective channel 406) but may also apply to cases with one or more optical filters 414 or filter banks 402, at least one channel 406, or, alternatively, two or more channels 406. Mixed sensor types may also be utilized such as but not limited to a density channel with an optical channel.

Generally, in some conventional interpretations of optical analysis, fluid sample 414 may keep a consistent or same fluid phase during each of a ten-second measurement circle. Fluid sample 414 may comprise a mixture of hydrocarbons and water, gas, or solids, especially in the case of water-based-mud, and also in transition zone sampling or sampling below the saturation pressure of a liquid for which gas evolves. Generally, fluid sample 414 may flow through flow path or sampling point 422 of light 418 and into an active channel pair 413 instead of or may rest for a static measurement. Optical measurement tool 336 may further be utilized to measure the ion concentration and pH of fluid sample 414.

Figure 5:
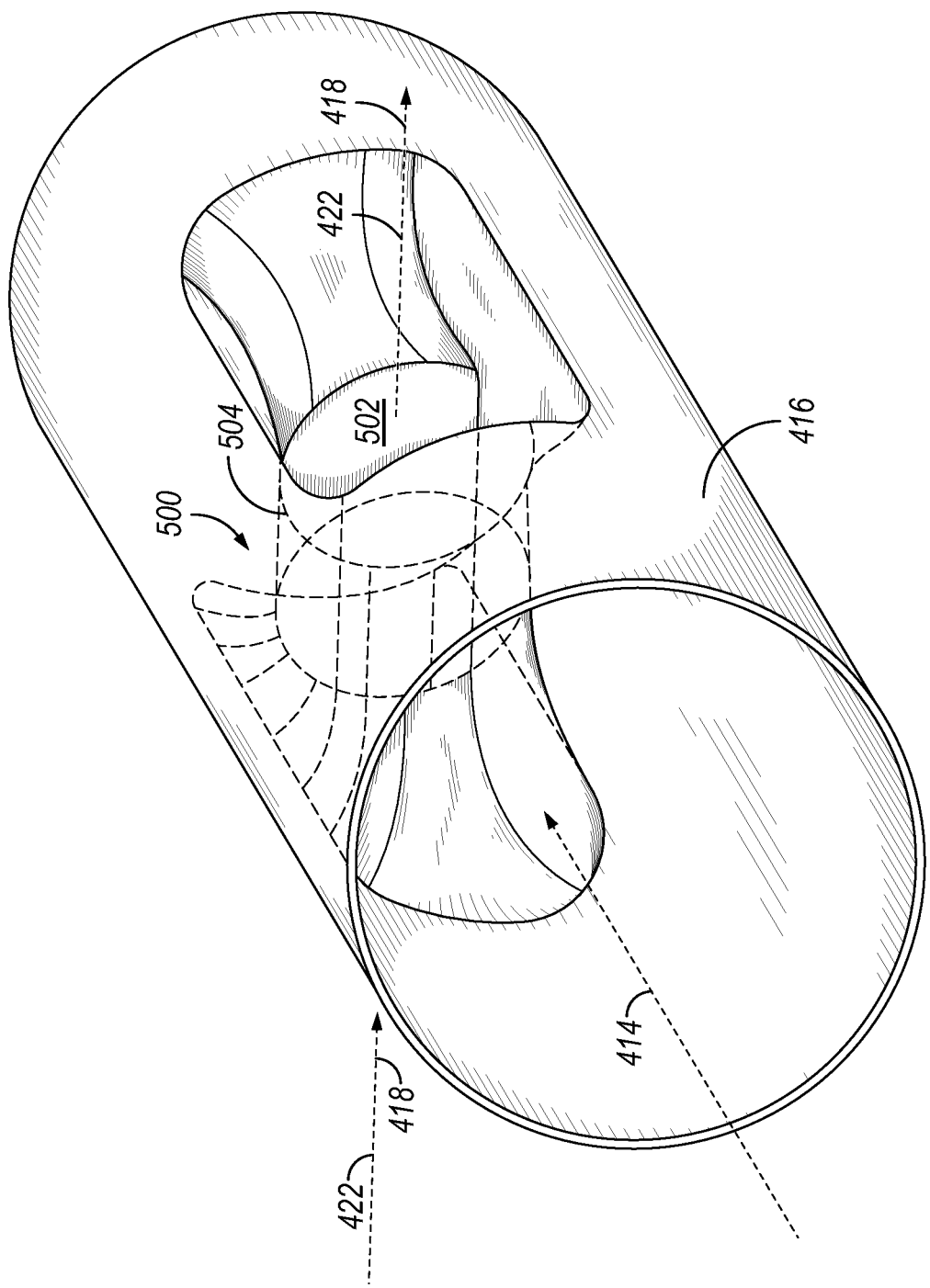
FIG. 5 illustrates a bridge disposed in the dynamic subsurface optical measurement tool.

To perform this measurement, a bridge 500 may be inserted into viewing region 416 and act as a conduit within the flow path 422 as illustrated in FIG. 5, wherein the bridge 500 is disposed in the dynamic subsurface optical measurement tool 336. In examples, bridge 500 may be a permanent structure and in other examples, it may be removable. As illustrated, bridge 500 may comprise a structure 504, which includes at least one substrate, a contrast agent 502, and optionally a mechanical support, that is connected on one side of the viewing region 416 and is further connected to a second side of the viewing region 416 along flow path 422. This may form a "window" between light source 400 and filter bank 402. Bridge 500 may form a structure of any shape as to allow for the placement of a contrast agent 502 within the path fluid 414 may flow through viewing region 416. Contrast agent 502 may be bound to the surface, contained within or otherwise immobilized by a substrate and held in place by structure 504. Structure 504 may be a porous and permeable form such as but not limited to a filter disk at least partially hollowed out for which fluid may freely flow but the structure remains in a local position within the viewing region 416. Structure 504 may be treated as to increase the preference of a component of the sample to permeate the structure such as a treatment with a hydrophobic coating, a hydrophilic coating, an oleophobic coating or an oleophilic coating in order to enhance, or restrict oil, or water from permeating the structure and reaching the substrate. The substrate may likewise be treated in order to enhance a component's interaction with the contrast agent 502. Such treatments may also enhance the specific transmission or rejection of measurement interference with the compounds, or the analyte itself along the structured path, or a parallel path around structure 504. The substrate may be of any size sufficient for immobilization and may be loosely packed or tightly packed as single entities or a plurality of entities. Examples of substrates include hydrogels, polyvinyl chloride, polymers, glasses, ceramics, zeolites. The requirements for a good substrate are the ability to contain the indicator within the desired time of use, sufficiently optically clear, or sufficiently clear to the energy type for which the indicator is being probed, resistant to downhole temperatures, pressures, and chemical environment.

In examples, bridge 500 may comprise a contrast agent 502 disposed on a substrate within structure 504. Contrast agent 502 may enhance the detection of analyte in the absorbing phase of the bridged substrate. Contrast agent 502 may be any molecules configured to interact with the analyte and alter a property of the analyte and/or contrast agent 502, wherein the property is detectable by a downhole sensor, such as an optical sensor. Examples of optical contrast agent 502 include dyes. In some embodiments, the optical contrast agent 502 comprises a metal porphyrin, such as cobalt (II) phthalocyanine (CoPc). CoPc is responsive to aqueous pH as shown in chemical reaction (1) below:

nol red, fluorescent indicator, phenol red sodium salt, metanil yellow, phenolphthalein solution, naphthol green, 3-nitrophenol, pH-indicator solution, and pyrogallol red.

In some embodiments, contrast agent 502 may respond to components in the flowline other than the analyte. For example, a contrast agent sensitive to $H_2S$ may also respond to $CO_2$, pH, $Na^+$, $Ca^{2+}$, $K^+$, $Mg^{2+}$, $Cl^-$, $Br^-$, $SO_4^{2-}$, $HCO^{3-}$, $CO_3^{2-}$. As such, incorporation of other contrast agents sensitive to the interferences may also be used to deconvolute the influence of the analyte. In some embodiments, a plurality of contrast agents 502 may be mixed on the substrate within structure 504. For example, bridge 500 may comprise structure 504 having a plurality of contrast agents 502 evenly distributed therethrough on a single substrate. In some embodiments, a plurality of contrast agents 502 may be juxtaposed in the bridge 500. For example, distinct contrast agents 502 may be positioned in different portions of a substrate within a single structure 504 or may be separately incorporated into distinct substrates within the same structure or in different structures (not shown). Mathematical deconvolution of the energy analysis may be used to separate the multiple contrast agent's interaction with the Reaction (1)

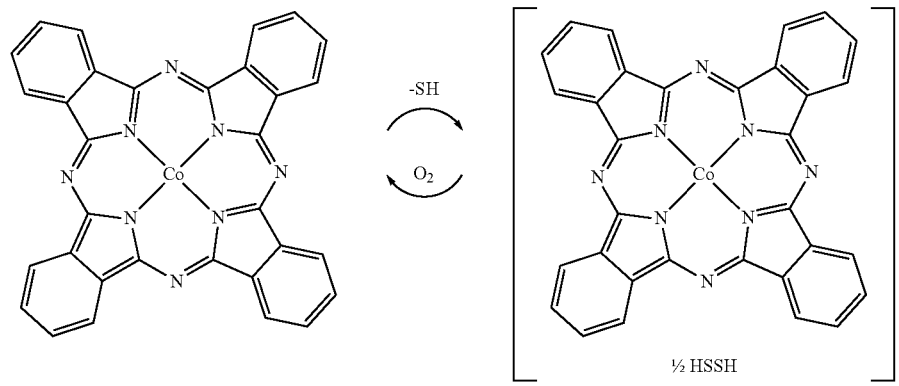

Other examples of porphyrins include those chelated with metal ions such as Gd, Mn, Fe, or Cu. In one or more embodiments, contrast agent 502 may comprise zinc oxide, titanium oxide, copper (II) nitrate, and/or cobalt (II) nitrate. In other embodiments, examples of contrast agents include phenol red, phenolphthalein, bromothymol blue, hematoxylin, methyl red, methylene blue, methyl orange, bromophenol blue, phenol red, bromocresol green, bromocresol purple, eriochrome blue-lack, eriochrome black T., eriochrome cyanine, methyl orange, calmagite, thymol blue, thymolphthalein, chromotropic acid disodium salt dihydrate, ferroin solution, murexide, xylenol orange, calcon, crystal violet, 1-naphtholbenzein, dithizone, neutral red, thorin, methylthymol blue sodium salt, indigo carmine, calconcarboxylic acid, titan yellow, cresol red, m-cresol purple, phthalein purple, congo red, disulfine blue, 1-(2-pyridylazo)-2-naphthol, fluorescein sodium, zinc iodide starch solution, phenol red solution, alizarin red S mono sodium salt, iodine indicator, bromocresol green sodium salt, ferroin indicator solution, calcein indicator, phenylhydrazinium chloride, arsenazo III, diphenylamine-4-sulfonic acid barium salt, 3,5-pyrocatecholdisulfonic acid disodium salt monohydrate, alkali blue, quinaldine red, sudan III, uranine AP, 1-naphtholphthalein, methyl red sodium salt, bromopheanalyte or analytes such as a multivariate data analysis applied to spectroscopy, for example.

In one or more embodiments, the analyte is related to water chemistry, i.e., an ion dissolved in an aqueous fluid such as $Na^+$, $K^+$, $Mg^{2+}$, $Ca^{2+}$, $CO_3^{2-}$, $HCO_3^-$, $SO_4^{2-}$, or $Cl^-$. In one or more embodiments, the analyte comprises hydrogen ion (pH measurement) or carbon dioxide. In one or more embodiments, the analyte comprises lead. In one or more embodiments, the analyte is hydrogen ion to measure the pH of fluid 414.

Bridge 500 may mitigate the presence of multiphase, water, oil or gas, and particulates that may interfere in optical measurements with respect to water and oil. In examples, contrast agent 502 may be able to quantify the total volume of water in a mixture including an emulsion should the formation water concentration of at least one analyte be known. The measuring of component concentration may be internally referenced by selection of an appropriate contrast agent 502 which is optically active in two mutually exclusive states, or by a combination of indicators that are mutually exclusive in two or more states. Generally, the geometry of bridge 500 may allow contrast agent 502 to be fully exposed to fluid 414 moving through viewing region 416.

As illustrated in FIG. 5, the geometry of bridge 500 is designed to allow fluid flow around bridge 500 while channeling optical energy along flow path 422. The geometry of bridge 500 may comprise three factors that may be optimized to any given analysis. These factors may comprise flow path 422, flow dynamics, and substrate miscibility for which volume to surface area is a characteristic. For example, bridge 500 may be soluble to a selected phase for which that selected phase permeates and absorbs into the substrate of structure 504. To help in absorption, bridge 500 may have a large surface area to volume ratio in order to maximize the adsorption of compatible fluid. Additionally, geometry of the shape of bridge 500 may be designed to optimize the transmission of optical energy. The geometry of bridge 500 may also promote flow across bridge 500 and prevent buildup of particles. These three competing features provide different optimal designs for different environments; however, a generic shape is shown in FIG. 5.

Figure 6:
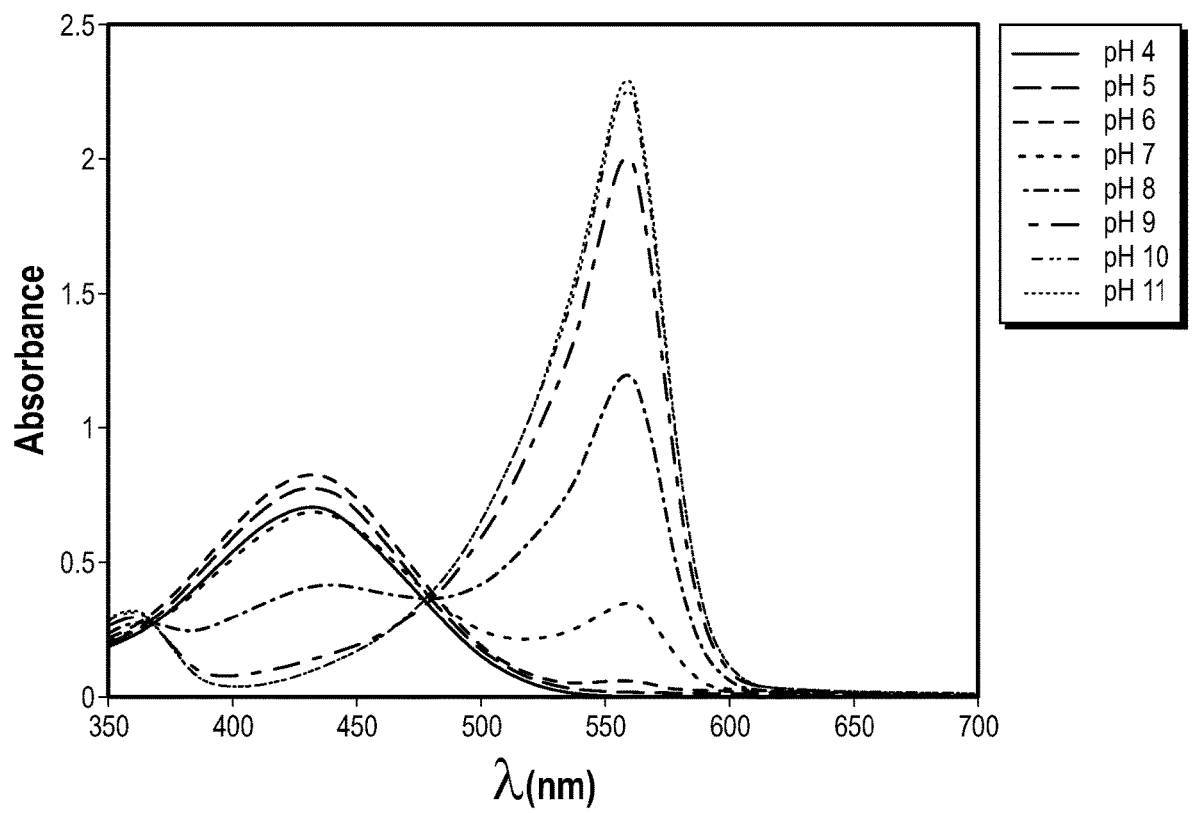
FIG. 6 shows infrared absorbance spectra of one embodiment of the present disclosure exposed at pH from 4 to 11.
Figure 7:
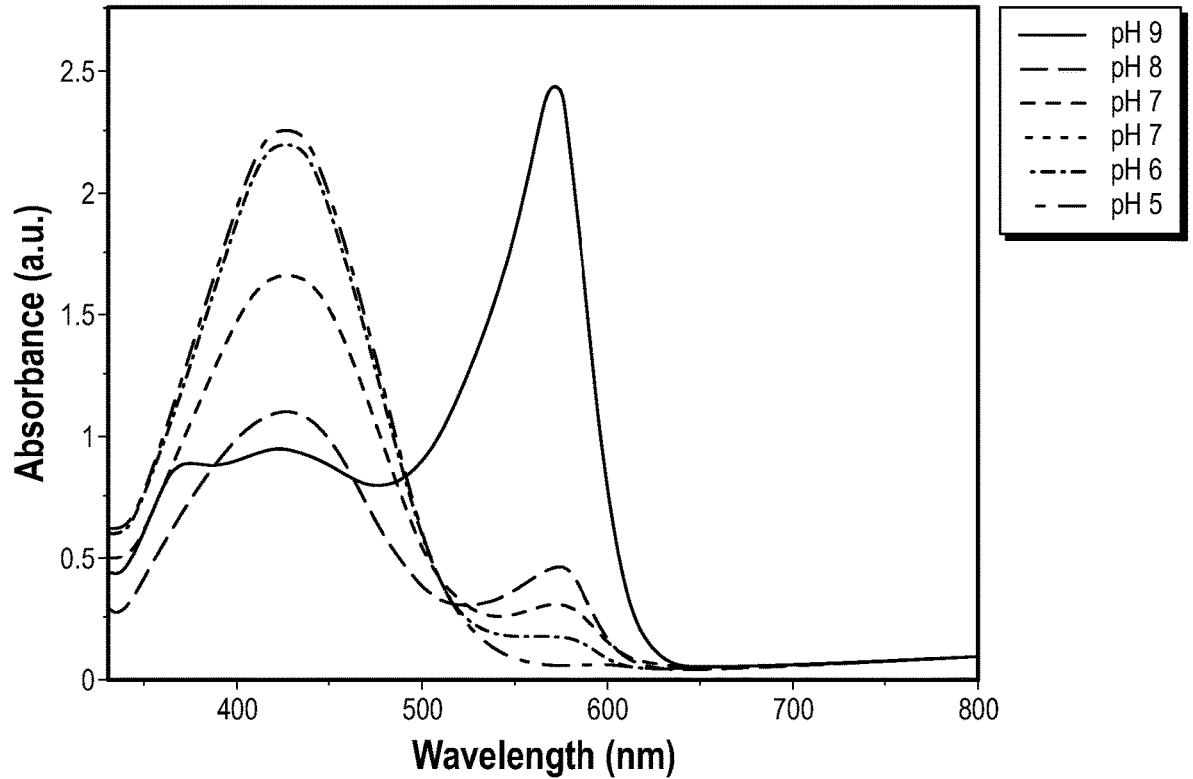
FIG. 7 shows infrared absorbance spectra of one embodiment of the present disclosure exposed at pH from 5 to 9.

For example, the larger the surface area to volume ratio, the faster the response time. The response time is defined as the time it takes for the concentration of the targeted analyte within structure 504 to reach equilibrium with the concentration of the targeted analyte in fluid 414. A response time of 30 seconds was achieved using a 3 millimeter in diameter disc for structure 504 comprising an alginate/polyacrylamide (PAAm) hydrogel as substrate supported by a ceramic disc as exoskeleton. In this example, a ceramic disk was drilled out to a washer shape to contain the hydrogel with a ⅜" hole in a 1" ceramic disk. The disk has a porosity of 36% and a permeability of 50 milliDarcies. Depending upon the environment of use, permeability and porosity may be adjusted within a variety of specifications. The ceramic disk was chosen for its hardness and resistance to abrasion. In the Example, phenol red was used as contrast agent 502 at a concentration of 0.2 wt % and the hydronium ion as targeted analyte to measure pH. The alginate/polyacrylamide (PAAm) hydrogel was chosen for its efficiency at protecting phenol red (the contrast agent 502 in the example) from the oil phase. The structure 504 comprising the ceramic disk as exoskeleton, alginate/polyacrylamide (PAAm) hydrogel as substrate, and phenol red as contrast agent 502, was successfully tested in buffer solutions at pH 4, pH 7, and pH 10 after being soaked in crude oil for 72 hours. The structure was also tested in 28 wt % sodium chloride for 24 hours at room temperature, 48 hours at 250 F and 15 kpsi, and 48 hours at room temperature but at 25 kpsi. After exposure to these typical downhole temperature, pressures and chemical environments, the responses of the contrast agent 502 (phenol red in these experiments) at pH=4, pH=5, pH=6, pH=7, pH=8, pH=9, pH=10, and pH=11 are illustrated in FIG. 6. As the pH goes from 4 to 11, the peak at 575 nm rises significantly. On the other hand, the peak at 425 nm increases from a pH of 11 to a pH of 6. FIG. 7 zooms in these two peaks between a pH of 5 to a pH of 9.

The ratio between these two peaks reached a constant value after 30 seconds. Contrast agents, such as phenol red, are particularly interesting as the variation of the two peaks at 425 nm and 575 nm as a function of pH can be used as internal reference following their ratio such that the variation of the ratio between these two peaks are constant as a function of pH regardless of the concentration of phenol red.

Accordingly, the present disclosure may provide a design for a bridge structure that may contain a contrast agent. The bridge structure may facilitate the movement of light and absorption of identified fluid for analyses by a contrast agent. The methods may include any of the various features disclosed herein, including one or more of the following statements.

Statement 1. A downhole fluid sampling tool comprising: an optical measurement tool; a flow path disposed in the optical measurement tool; and a bridge disposed in a transparent portion of the flow path forming a bridge between a light source and a light modifier and an optical detector.

Statement 2. The downhole fluid sampling tool of Statement 1, wherein the bridge comprises a structure comprising a substrate and a contrast agent.

Statement 3. The downhole sampling tool of Statement 1 or Statement 2, wherein the structure comprises a mechanical support.

Statement 4. The downhole sampling tool of any of the preceding Statements, wherein the bridge comprises a contrast agent immobilized by a substrate held in place by a structure within the window.

Statement 5. The downhole sampling tool of any of the preceding Statements, the substrate is one of hydrophilic, hydrophobic, oleophobic, and oleophilic.

Statement 6, The downhole sampling tool of any of the preceding Statements, wherein the structure is one of hydrophilic, hydrophobic, oleophobic, and oleophilic.

Statement 7. The downhole sampling tool of any of the preceding Statements, wherein the substrate is a hydrogel.

Statement 8. The downhole sampling tool of any of the preceding Statements, wherein the structure comprises an exoskeleton.

Statement 9. The downhole sampling tool of any of the preceding Statements, wherein the contrast agent is any molecule configured to interact with an analyte and alter a property of the analyte and/or contrast agent, wherein the property is detectable by the filter bank.

Statement 10. The downhole sampling tool of any of the preceding Statements, wherein quantification of the contrast agent relies on a ratio of at least two different absorbing peaks in the light spectrum.

Statement 11. The downhole sampling tool of any of the preceding Statements, wherein the contrast agent is a dye.

Statement 12. The downhole sampling tool of any of the preceding Statements, wherein the contrast agent is one of phenolphthalein, bromothymol blue, hematoxylin, methyl red, methylene blue, methyl orange, bromophenol blue, phenol red, bromocresol green, bromocresol purple, eriochrome blue-lack, eriochrome black T., eriochrome cyanine, methyl orange, calmagite, thymol blue, thymolphthalein, chromotropic acid disodium salt dihydrate, ferroin solution, murexide, xylenol orange, calcon, crystal violet, 1-naphtholbenzein, dithizone, neutral red, thorin, methylthymol blue sodium salt, indigo carmine, calconcarboxylic acid, titan yellow, cresol red, m-cresol purple, phthalein purple, congo red, disulfine blue, 1-(2-pyridylazo)-2-naphthol, fluorescein sodium, zinc iodide starch solution, alizarin red S mono sodium salt, iodine indicator, bromocresol green sodium salt, ferroin indicator solution, calcein indicator, phenylhydrazinium chloride, arsenazo III, diphenylamine-4-sulfonic acid barium salt, 3,5-pyrocatecholdisulfonic acid disodium salt monohydrate, alkali blue, quinaldine red, sudan III, uranine AP, 1-naphtholphthalein, methyl red sodium salt, fluorescent indicator, metanil yellow, phenolphthalein solution, naphthol green, 3-nitrophenol, pH-indicator solution, and pyrogallol red.

Statement 13. The downhole sampling tool of any of the preceding Statements, wherein the bridge comprises a plurality of contrast agents with at least one first contrast agent sensitive to an analyte and at least a second contrast agent sensitive to an interference between the first contrast agent and the analyte to deconvolute the influence of the analyte from the interference.

Statement 14. The downhole sampling tool of any of the preceding Statements, wherein the different contrast agents are positioned in different portions of a single substrate.

Statement 15. The downhole sampling tool of any of the preceding Statements, wherein the different contrast agents are separately incorporated into distinct substrates.

Statement 16. The downhole sampling tool of any of the preceding Statements, wherein the interaction of the plurality of contrast agents with the analyte is separated by a mathematical deconvolution of the energy analysis of the optical measurement.

Statement 17. A method of quantifying the total volume of water in a multiphase mixture in a downhole tool comprising: pumping a formation fluid in a downhole tool comprising an optical measurement tool, a flow path disposed in the optical measurement tool, a bridge disposed in a transparent portion of the flow path forming a bridge between a light source and a light modifier and an optical detector, and a contrast agent; selecting at least one contrast agent which is optically active in two mutually exclusive states upon exposure to water and oil; and quantifying the total volume of water within optical measurement tool by quantifying the contrast agent optically active upon exposure to water.

Statement 18. The method of Statement 17, wherein the bridge comprises a contrast agent immobilized by a substrate held in place by a structure within the window, wherein the structure has a hydrophilic coating.

Statement 19. The method of Statement 17 or Statement 18, wherein the bridge comprises a plurality of contrast agents with at least one first contrast agent sensitive to an analyte and at least a second contrast agent sensitive to an interference between the first contrast agent and the analyte to deconvolute the influence of the analyte from the interference.

Statement 20. The method of any of Statements 17-19, wherein the interaction of the plurality of contrast agents with the analyte is separated by a mathematical deconvolution of the energy analysis of the optical measurement.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A downhole fluid sampling tool comprising:
   an optical measurement tool;
   a flow path disposed in the optical measurement tool; and
   a bridge disposed in a transparent portion of the flow path forming a bridge between a light source and a light modifier and an optical detector.

2. The downhole fluid sampling tool of claim 1, wherein the bridge comprises a structure comprising a substrate and a contrast agent.

3. The downhole fluid sampling tool of claim 2, wherein the structure comprises a mechanical support.

4. The downhole fluid sampling tool of claim 2, wherein the contrast agent is any molecule configured to interact with an analyte and alter a property of the analyte and/or contrast agent, wherein the property is detectable by the light modifier in combination with the detector.

5. The downhole fluid sampling tool of claim 2, wherein quantification of the contrast agent relies on a ratio of at least two different absorbing peaks in a light spectrum.

6. The downhole fluid sampling tool of claim 2, wherein the contrast agent is a dye.

7. The downhole fluid sampling tool of claim 2, wherein the contrast agent is selected from the group consisting of phenolphthalein, bromothymol blue, hematoxylin, methyl red, methylene blue, methyl orange, bromophenol blue, phenol red, bromocresol green, bromocresol purple, eriochrome blue-lack, eriochrome black T., eriochrome cyanine, methyl orange, calmagite, thymol blue, thymolphthalein, chromotropic acid disodium salt dihydrate, ferroin solution, murexide, xylenol orange, calcon, crystal violet, 1-naphtholbenzein, dithizone, neutral red, thorin, methylthymol blue sodium salt, indigo carmine, calconcarboxylic acid, titan yellow, cresol red, m-cresol purple, phthalein purple, congo red, disulfine blue, 1-(2-pyridylazo)-2-naphthol, fluorescein sodium, zinc iodide starch solution, alizarin red S mono sodium salt, iodine indicator, bromocresol green sodium salt, ferroin indicator solution, calcein indicator, phenylhydrazinium chloride, arsenazo III, diphenylamine-4-sulfonic acid barium salt, 3,5-pyrocatecholdisulfonic acid disodium salt monohydrate, alkali blue, quinaldine red, sudan III, uranine AP, 1-naphtholphthalein, methyl red sodium salt, fluorescent indicator, metanil yellow, phenolphthalein solution, naphthol green, 3-nitrophenol, pH-indicator solution, and pyrogallol red.

8. The downhole fluid sampling tool of claim 1, wherein the bridge comprises a contrast agent immobilized by a substrate held in place by a structure within the transparent portion of the flow path.

9. The downhole fluid sampling tool of claim 8, wherein the substrate is one of hydrophilic, hydrophobic, oleophobic, and oleophilic.

10. The downhole fluid sampling tool of claim 8, wherein the structure is one of hydrophilic, hydrophobic, oleophobic, and oleophilic.

11. The downhole fluid sampling tool of claim 8, wherein the substrate is a hydrogel.

12. The downhole fluid sampling tool of claim 8, wherein the structure comprises an exoskeleton.

13. The downhole fluid sampling tool of claim 1, wherein the bridge comprises a plurality of contrast agents with at least one first contrast agent sensitive to an analyte and at least a second contrast agent sensitive to an interference between the first contrast agent and the analyte to deconvolute an influence of the analyte from the interference.

14. The downhole fluid sampling tool of claim 13, wherein different contrast agents are positioned in different portions of a single substrate.

15. The downhole fluid sampling tool of claim 13, wherein different contrast agents are separately incorporated into distinct substrates.

16. The downhole fluid sampling tool of claim 13, wherein an interaction of the plurality of contrast agents with the analytes is separated by a mathematical deconvolution of an energy analysis of an optical measurement.

17. A method of quantifying a total volume of water in a multiphase mixture in a downhole tool comprising:
    pumping a formation fluid in a downhole tool comprising an optical measurement tool, a flow path disposed in the optical measurement tool, a bridge disposed in a transparent portion of the flow path forming a bridge between a light source and a light modifier, and an optical detector and a contrast agent;
    selecting at least one contrast agent which is optically active in two mutually exclusive states upon exposure to water and oil; and
    quantifying the total volume of water within optical measurement tool by quantifying the contrast agent optically active upon exposure to water.

18. The method of claim 17, wherein the bridge comprises a contrast agent immobilized by a substrate held in place by a structure within a window, wherein the structure has a hydrophilic coating.

19. The method of claim 17, wherein the bridge comprises a plurality of contrast agents with at least one first contrast agent sensitive to an analyte and at least a second contrast agent sensitive to an interference between the first contrast agent and the analyte to deconvolute an influence of the analyte from the interference.

20. The method of claim 19, wherein an interaction of the plurality of contrast agents with the analytes is separated by a mathematical deconvolution of an energy analysis of an optical measurement.

* * * * *